United States Patent
Kim et al.

(10) Patent No.: US 10,613,193 B2
(45) Date of Patent: Apr. 7, 2020

(54) RADCOM SYSTEM AND METHOD FOR VEHICLE USING FAST CHIRP SIGNAL

(71) Applicant: Korea Electronics Technology Institute, Seongnam-si, Gyeonggi-do (KR)

(72) Inventors: Ki Jin Kim, Yongin-si (KR); Kwang Ho Ahan, Yongin-si (KR)

(73) Assignee: Korea Electronics Technology Institute, Gyeonggi-do (KR)

(*) Notice: Subject to any disclaimer, the term of this patent is extended or adjusted under 35 U.S.C. 154(b) by 423 days.

(21) Appl. No.: 15/439,655

(22) Filed: Feb. 22, 2017

(65) Prior Publication Data

US 2018/0031673 A1 Feb. 1, 2018

(30) Foreign Application Priority Data

Jul. 29, 2016 (KR) .................. 10-2016-0096948

(51) Int. Cl.
| | |
|---|---|
| *G01S 7/00* | (2006.01) |
| *G01S 7/03* | (2006.01) |
| *H04B 1/3805* | (2015.01) |
| *G01S 13/34* | (2006.01) |
| *G01S 13/931* | (2020.01) |
| *G01S 7/35* | (2006.01) |
| *H04B 1/04* | (2006.01) |
| *G01S 13/93* | (2020.01) |

(52) U.S. Cl.
CPC ............... *G01S 7/006* (2013.01); *G01S 7/03* (2013.01); *G01S 7/35* (2013.01); *G01S 13/343* (2013.01); *G01S 13/345* (2013.01); *G01S 13/931* (2013.01); *H04B 1/04* (2013.01); *H04B 1/3805* (2013.01); *G01S 2013/936* (2013.01)

(58) Field of Classification Search
CPC .................................. G01S 7/006; G01S 7/03
USPC ............................................................ 342/58
See application file for complete search history.

(56) References Cited

U.S. PATENT DOCUMENTS

| | | | |
|---|---|---|---|
| 8,730,097 B1* | 5/2014 | Uscinowicz | G01S 7/4017 342/165 |
| 2005/0285773 A1* | 12/2005 | Hartzstein | G01S 7/032 342/70 |
| 2014/0035774 A1* | 2/2014 | Khlifi | G01S 7/006 342/21 |

* cited by examiner

*Primary Examiner* — Peter M Bythrow
*Assistant Examiner* — Helena H Seraydaryan
(74) *Attorney, Agent, or Firm* — Knobbe Martens Olson & Bear LLP (57) ABSTRACT

A radar and communication (RadCom) system and a method for vehicles using a fast chirp signal are provided. A radar system includes a phase locked loop (PLL) configured to generate a radar signal, a signal generator configured to generate a communication signal and a mixer configured to mix the radar signal and the communication signal. The system also includes a transmitter configured to transmit an output signal from the mixer, a first switch configured to switch not to transmit the communication signal to the mixer in a radar mode, and a second switch configured to switch to connect a first filter to the PLL when the radar mode ends. Accordingly, RadCom transmission and reception using the fast chirp signal is possible.

5 Claims, 7 Drawing Sheets

FIG. 1

(Related Art)

FIG. 2

(Related Art)

FIG. 3

(Related Art)

RADCOM SYSTEM AND METHOD FOR VEHICLE USING FAST CHIRP SIGNAL

INCORPORATION BY REFERENCE TO ANY PRIORITY APPLICATIONS

The present application claims the benefit under 35 U.S.C. § 119(a) to a Korean patent application filed in the Korean Intellectual Property Office on Jul. 29, 2016, and assigned Serial No. 10-2016-0096948, the entire disclosure of which is hereby incorporated by reference.

BACKGROUND

Field

The present disclosure relates generally to radar-related technology, and more particularly, to a radar and communication (RadCom) system and a method which combine radar and communication technologies.

Description of the Related Technology

Figure 1:
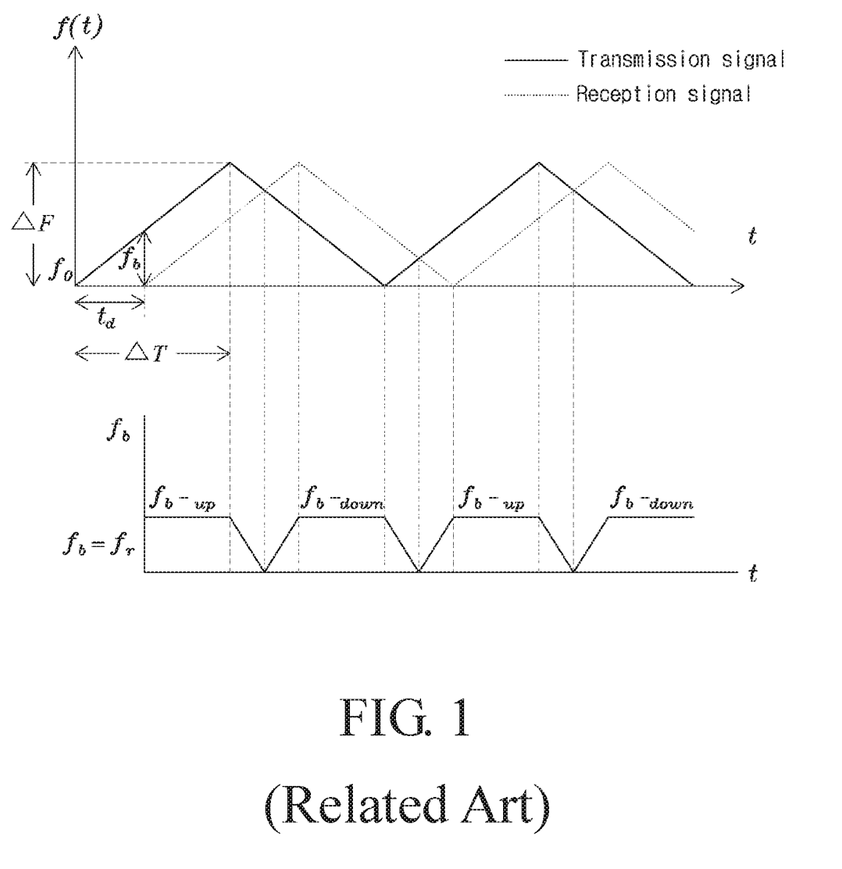
FIG. 1 is a view showing an FMCW radar waveform currently used.

FIG. 1 illustrates a frequency modulated continuous wave (FMCW) radar waveform currently used. An FMCW radar signal is made to have a frequency changed by ΔF during a ΔT time and is transmitted, and then a signal reflected from a target is received. When the two signals are mixed in a mixer, information $f_b$ indicating information including distance information and speed information can be obtained. Equations related to $f_b$ are as follows:

$$f_b = \alpha t_d + f_d = \frac{\Delta F}{\Delta T}\frac{2R}{c} \mp f_d$$

$$f_r = \frac{f_{b\text{-}down} + f_{b\text{-}up}}{2}$$

$$f_d = \frac{f_{b\text{-}down} - f_{b\text{-}up}}{2}$$

$$V_r = \frac{c \cdot f_d}{2 \cdot f_0}$$

Herein, $f_b$ is frequency information outputted form a mixer, R is a distance to a target, c is the speed of light, and $f_d$ is a Doppler frequency. $f_0$ is a carrier frequency and $V_r$ is a speed of a target. A distance resolution generated by this waveform equals $c/(4\Delta F)$.

According to the above-described equations, as ΔF increases, the distance resolution increases. As ΔF increases and ΔT decreases, $f_b$ increases. In addition, $f_d$ is not changed when the carrier frequency and the speed of the target are determined.

Figure 2:
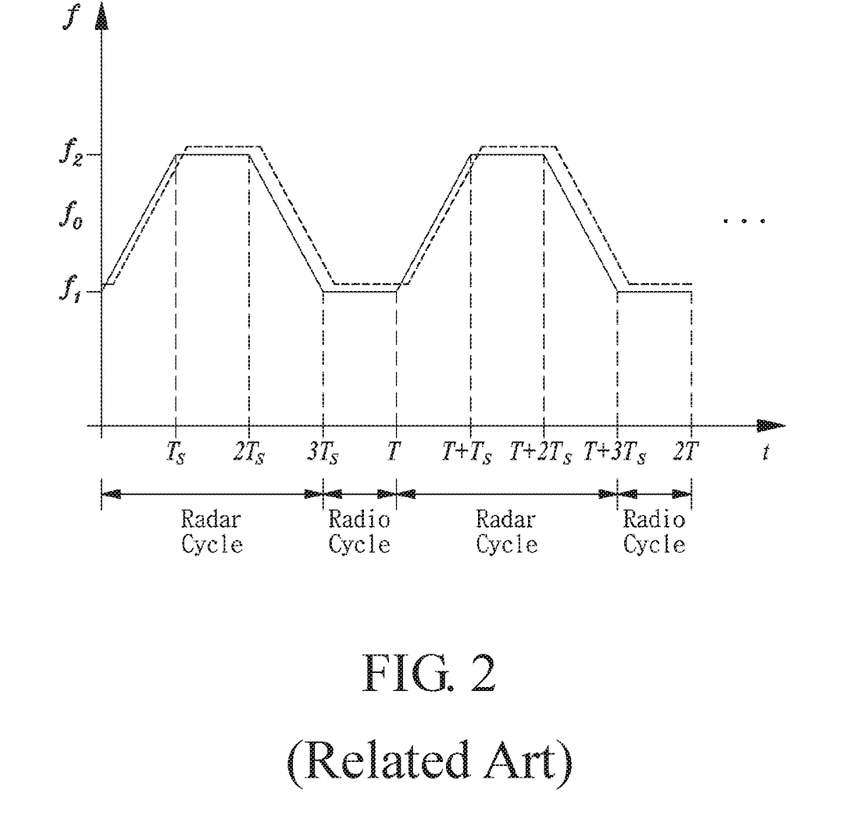
FIG. 2 is a view showing a RadCom waveform currently used.

FIG. 2 is a view illustrating a RadCom waveform currently used. "RadCom" is a compound word of "Radar" and "Communication" and refers to technology which performs radar and communication by adjusting a waveform based on a frequency resource.

Figure 3:
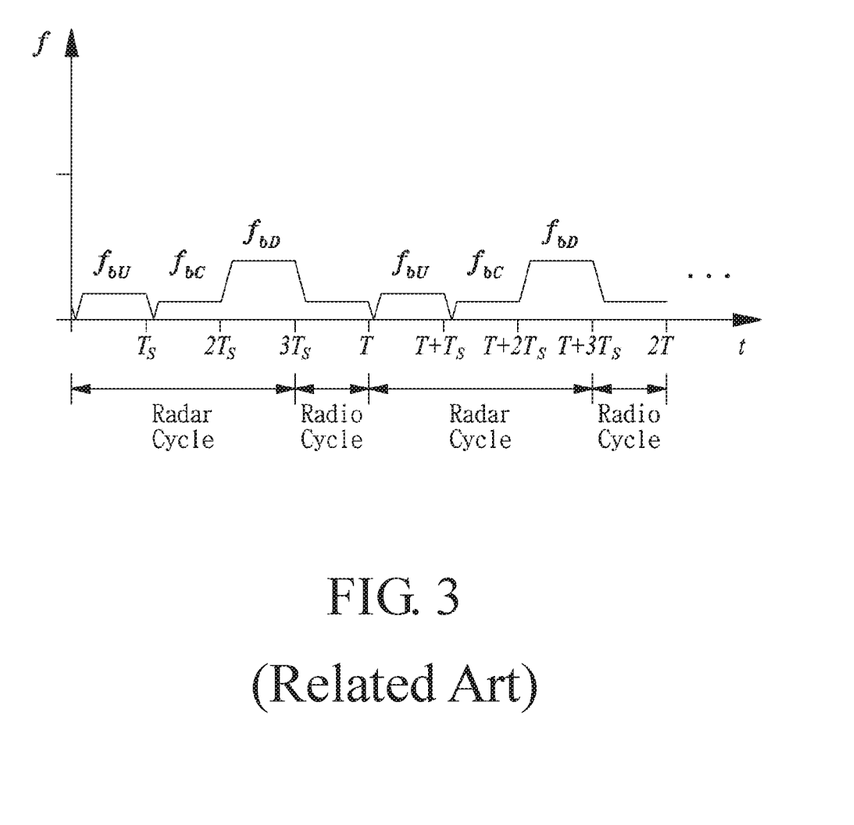
FIG. 3 is a view showing $f_b$ information regarding the RadCom waveform of FIG. 2.

Specifically, as shown in FIG. 2, radar is used until $3T_s$ and then communication is performed during T. $f_b$ generated by this technology is as shown in FIG. 3.

Current RadCom aims at providing communication of 25 Mbps using a low frequency of a 5 GHz band. However, as shown in FIG. 3, there is a problem that diverse $f_b$ information should be analyzed and also a noise caused by the Doppler frequency during communication should be overcome.

SUMMARY OF CERTAIN INVENTIVE ASPECTS

One inventive aspect relates to a RadCom system and a method using a fast chirp signal as a solution to increase a distance resolution and reduce a communication noise.

According to another aspect of the present invention, a radar system includes: a phase locked loop (PLL) configured to generate a radar signal; a signal generator configured to generate a communication signal; a mixer configured to mix the radar signal and the communication signal; a transmitter configured to transmit an output signal from the mixer; a first switch configured to switch not to transmit the communication signal to the mixer in a radar mode; and a second switch configured to switch to connect a first filter to the PLL when the radar mode ends.

In addition, a frequency settling time in a state in which the first filter is connected to the PLL may be shorter than a frequency settling time in which the first filter is not connected to the PLL.

In a communication mode, the second switch may be configured to switch to connect a second filter to the PPL.

A band of the first filter may be wider than a band of the second filter.

In addition, the first filter may be a wideband loop filter.

In addition, the second filter may be a narrow band loop filter.

The radar signal may be a chirp signal.

The PLL may be configured to generate a chirp signal by performing a linear frequency modulation (LFM) in the radar mode.

The first switch may be configured to switch in a section between the communication mode and the radar mode.

According to another aspect of the present invention, a method for generating a RadCom signal includes: generating, by a PLL, a radar signal; generating, by a signal generator, a communication signal; mixing, by a mixer, the radar signal and the communication signal; transmitting, by a transmitter, an output signal from the mixer; switching, by a first switch, not to transmit the communication signal to the mixer in a radar mode; and when the radar mode ends, switching, by a second switch, to connect a first filter to the PLL.

According to another aspect of the present invention, a radar signal generator includes: a PLL configured to generate a radar signal; a first filter; a second filter; and a switch configured to, when a radar mode ends, switch to connect the first filter to the PLL, and, in a communication mode, switch to connect the second filter to the PLL.

According to another aspect of the present invention, a method for generating a radar signal includes: generating, by a PLL, a radar signal; when a radar mode ends, switching, by a switch, to connect a first filter to the PLL; and, in a communication mode, switching, by the switch, to connect a second filter to the PLL.

According to exemplary embodiments of the present disclosure described above, through RadCom transmission and reception using a fast chirp signal, a distance resolution can be enhanced and also a communication noise can be noticeably reduced.

Other aspects, advantages, and salient features of the described technology will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF CERTAIN INVENTIVE EMBODIMENTS

Reference will now be made in detail to the embodiment of the described technology, examples of which are illustrated in the accompanying drawings, wherein like reference numerals refer to the like elements throughout. The embodiment is described below in order to explain the described technology by referring to the drawings.

Figure 4:
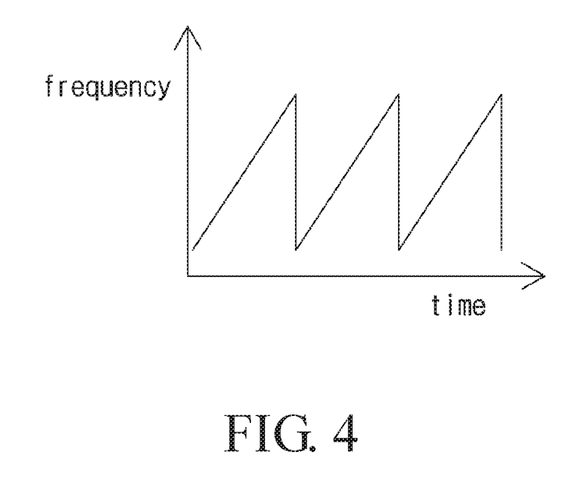
FIG. 4 is a view showing a fast chirp signal.

FIG. 4 is a view illustrating a fast chirp signal. The fast chirp signal has a Δf/ΔT even greater than that of an FMCW. As described above, as Δf/ΔT increases, $f_b$ increases.

The range of $f_b$ at 79 GHz radar is from 1 MHz to 40 MHz, and the Doppler frequency is lower than 40 KHz. In addition, from the fast chirp signal, speed information of a target may be extracted through a 2D FFT without the Doppler frequency.

As described above, the fast chirp signal has the merits that it has great $f_b$ and removes the low Doppler frequency. Therefore, a high-speed RadCom method using a fast chirp signal and a RadCom system applying the same are suggested in the embodiments of the present disclosure.

Figure 5:
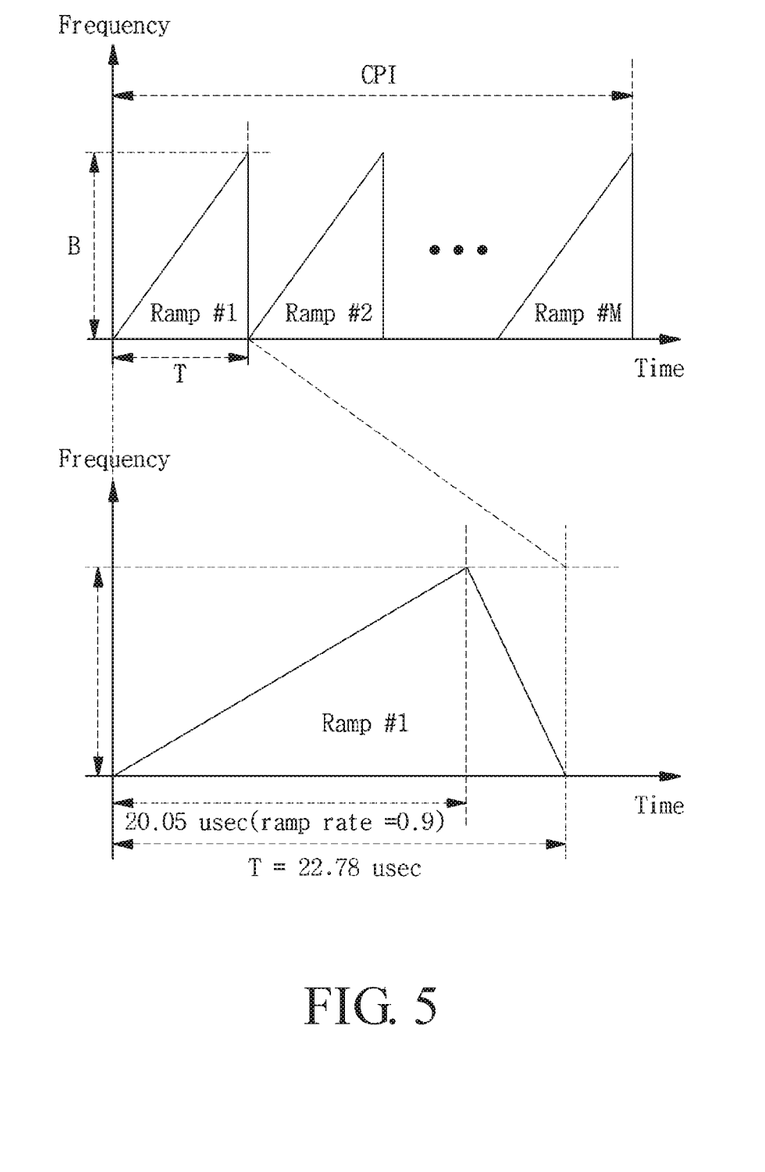
FIG. 5 is a view enlarging a 79 GHz fast chirp signal waveform and a certain waveform.

FIG. 5 is a view enlarging a 79 GHz fast chirp signal waveform and a certain waveform. As shown in the lower drawing, a certain waveform of the fast chirp signal includes a frequency sweep time of about 20.05 μs and a frequency settling time of about 2.73 μs.

Figure 6:
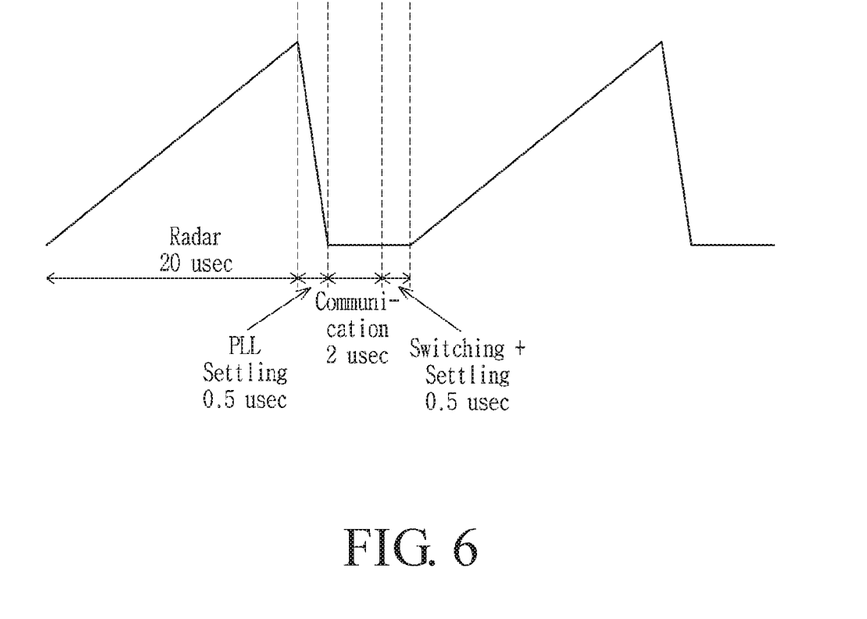
FIG. 6 is a view showing a 79 GHz fast chirp signal waveform to be used in an embodiment of the present disclosure.

For convenience of explanation, it is assumed that the sweep time and the frequency settling time of the fast chirp signal are 20 μs and 3 μs, respectively. FIG. 6 is a view showing a 79 GHz fast chirp signal waveform to be used in the embodiments of the present disclosure.

As shown in FIG. 6, the fast chirp signal to be used in the embodiments of the present disclosure reduces the switching time plus settling time to 0.5 μs, and allocates 2 μs to a next communication time and allocates 0.5 μs to the next switching time plus settling time.

Since the fast chirp signal shown in FIG. 6 can remove a Doppler noise, a communication signal-to-noise ratio is high. Although only 2 μs of 23 μs is allocated to the communication time, high-speed communication of 500 Mbps or higher is possible even when QPSK is applied since wideband communication of 75 GHZ is possible.

Hereinafter, a system for performing RadCom by generating the fast chirp signal shown in FIG. 6 will be described in detail with reference to FIG. 7.

Figure 7:
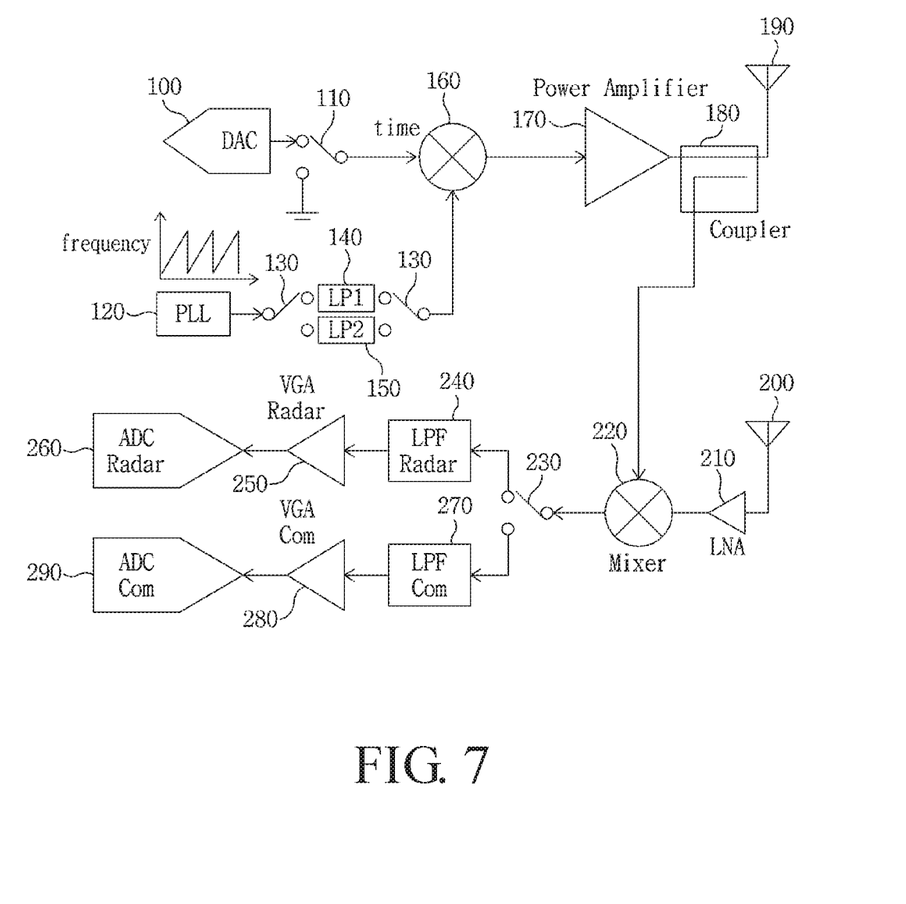
FIG. 7 is a block diagram of a RadCom system according to an exemplary embodiment of the present disclosure.

FIG. 7 is a block diagram illustrating a RadCom system according to an exemplary embodiment of the present disclosure. The RadCom system according to an exemplary embodiment of the present disclosure performs RadCom using the fast chirp signal.

A transmission end of the RadCom system according to an exemplary embodiment performing the above-described function includes a digital to analog converter (DAC) 100, a switch-1 110, a phase locked loop (PLL) 120, a switch-2 130, a wideband loop filter 140, a narrow band loop filter 150, a mixer-1 160, a power amplifier (PA) 170, a coupler 180, and a transmission antenna 190, as shown in FIG. 7.

The DAC 100 converts a digital communication signal inputted from a processor (not shown) into an analogue communication signal, and outputs the analogue communication signal to the switch-1 110. The DAC 100 may be implemented to operate only in a communication mode.

The switch-1 110 switches an electric connection between the DAC 100 and the mixer-1 160. Specifically, in the communication mode, the switch-1 110 switches to connect the DAC 100 and the mixer-1 160 with each other. Accordingly, in the communication mode, a communication signal outputted from the DAC 100 is transmitted to the mixer-1 160 via the switch-1 110.

In a radar mode, the switch-1 110 switches not to connect the DAC 100 and the mixer-1 160. Specifically, the switch-1 110 connects the mixer-1 160 to a grounded end, thereby preventing a communication signal from being transmitted to the mixer-1 160 even when the communication signal is outputted from the DAC 100.

The switching operation of the switch-1 110 is performed in a section (0.5 μs) between the end time of the radar mode and the start time of the communication mode, and in a section (0.5 μs) between the end time of the communication mode and the start time of the radar mode.

The PLL 120 generates a fast chirp signal and outputs the fast chirp signal to the switch-2 130. Specifically, the PLL 120 performs linear frequency modulation (LFM) in the radar mode, and performs frequency settling when the radar mode ends and processes the fast chirp signal to be settled as a basic frequency in the communication mode.

The switch-2 130 selectively connects the PLL 1210 to the loop filter 140 or 150. Specifically, the switch-2 130 switches to connect the PLL 120 to the wideband loop filter 140 in the frequency settling section after the end of the radar mode, and switches the PLL 120 to the narrow band loop filter 150 in the other sections, specifically, in the communication mode.

In order to enter the communication mode, the frequency settling should be performed fast within 0.5 μs. Since wideband loop filtering is required in the PLL 120 to settle the frequency fast, the switch-2 130 switches to connect the PLL 120 to the wideband loop filter 140.

On the other hand, since narrow band loop filtering is required in the PLL 120 in order to reduce a phase noise in the communication mode, the switch-2 130 switches to connect the PLL 120 to the narrow band loop filter 150.

Herein, the frequency settling section corresponds to a section from the end time of the radar mode to the start time of the communication mode.

The mixer-1 160 mixes the communication signal transmitted via the switch-1 110 and the fast chirp signal transmitted via the switch-2 130, and the PA 170 amplifies the mixed signal. The amplified signal is transmitted via the transmission antenna 190 after passing through the coupler 180.

As described above, in the radar mode, only the fast chirp signal generated in the PLL 120 is transmitted via the transmission antenna 190 after passing through the mixer-1 160 and the PA 170. In addition, when the radar mode ends, the wideband loop filter 140 is connected to the PLL 120 by the switch-2 130, such that frequency settling is achieved at high speed.

On the other hand, in order to reduce a phase noise in the communication mode, the narrow band loop filter 150 is connected to the PLL 120 by the switch-2 120, and the communication signal outputted from the DAC 100 and the output signal from the PLL 120 are mixed in the mixer-1 160 and are transmitted via the transmission antenna 190 after passing through the PA 170.

A reception end of the RadCom system according to an exemplary embodiment of the present disclosure includes a reception antenna 200, a low noise amplifier (LNA) 210, a mixer-2 220, a switch-3 230, a band pass filter (BPF) 240 for radar, a variable gain amplifier (VGA) 250 for radar, an analog to digital converter (ADC) 260 for radar, a low pass filter (LPF) 270 for communication, a VGA 280 for communication, and an ADC 290 for communication, as shown in FIG. 7.

A signal received via the reception antenna 200 is amplified in the LNA 210 and is then mixed with a transmission signal applied via the coupler 180 in the mixer-2 220, and the mixed signal is outputted to the switch-3 230.

In the radar mode, the switch-3 230 switches to electrically connect the mixer-2 220 and the BPF 240 for radar. Accordingly, the transmission signal and the reception signal which are mixed in the mixer-2 220 and transmitted via the switch-3 230 are filtered in the BPF 240 for radar and then are amplified in the VGA 250 for radar, and are converted into a digital signal in the ADC 260 for radar.

In the communication mode, the switch-3 230 switches to electrically connect the mixer-2 220 and the LPF 270 for communication. Accordingly, the transmission signal and the reception signal which are mixed in the mixer-2 220 and transmitted via the switch-3 230 are filtered in the LPF 270 for communication and then are amplified in the VGA 280, and are converted into a digital signal in the ADC 290 for communication.

Up to now, the RadCom system for vehicles using a fast chirp signal according to preferred embodiments has been described.

The RadCom system described in the above-described embodiments can be applied to a military or private radar system as well as a vehicle.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A radar system configured to switch between a radar mode and a communication mode, the radar system comprising:
    a phase locked loop (PLL) configured to generate a radar signal;
    a signal generator configured to generate a communication signal different from the radar signal;
    a mixer configured to be connected to at least one of the PPL and the signal generator and output a mixer signal based on at least one of the radar signal and the communication signal;
    an amplifier configured to amplify the mixer signal and output an amplified signal;
    an antenna configured to transmit the amplified signal;
    a first switch configured to connect the signal generator and the mixer in the communication mode and disconnect the signal generator from the mixer in the radar mode such that the communication signal from the signal generator is input to the mixer in the communication mode and is not input to the mixer in the radar mode; and
    a second switch configured to selectively connect wideband loop filter and a narrowband loop filter between the PLL and the mixer, wherein the second switch is further configured to connect the wideband loop filter between the PLL and the mixer after performing the radar mode and before switching to the communication mode, and wherein the second switch is further configured to connect the narrowband loop filter between the PLL and the mixer in the communication mode.

2. The radar system of claim 1, wherein the PLL is configured to perform a linear frequency modulation (LFM) in the radar mode, and wherein the PLL is further configured to perform frequency settling during a frequency setting period after performing the radar mode and before switching to the communication mode.

3. The radar system of claim 1, wherein the radar signal is a chirp signal.

4. The radar system of claim 3, wherein the PLL is configured to generate the chirp signal by performing a linear frequency modulation (LFM) in the radar mode.

5. A method of operating a radar system to switch between a radar mode and a communication mode, the method comprising:
    generating, by a phase locked loop (PLL), a radar signal;
    generating, by a signal generator, a communication signal different from the radar signal;
    generating a mixer signal, by a mixer, based on at least one of the radar signal and the communication signal;
    amplifying, using an amplifier, the mixer signal to output an amplified signal;
    transmitting, using an antenna, the amplified signal;
    operating a first switch interposed between the signal generator and the mixer such that the communication signal is input to the mixer in the communication mode and is not input to the mixer in the radar mode; and
    operating a second switch to selectively connect a wideband loop filter and a narrowband loop filter between the PLL and the mixer such that the wideband loop filter is connected between the PLL and the mixer after performing the radar mode and before switching to the communication mode and further such that the narrowband loop filter is connected between the PLL and the mixer in the communication mode.

* * * * *